United States Patent
Banerjee et al.

(10) Patent No.: US 9,594,596 B2
(45) Date of Patent: Mar. 14, 2017

(54) DYNAMICALLY TUNING SERVER PLACEMENT

(75) Inventors: Pradipta Kumar Banerjee, Bangalore (IN); Swarnalatha Mylavarapu, Bangalore (IN); Vijay K. Sukthankar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 97 days.

(21) Appl. No.: 13/433,791

(22) Filed: Mar. 29, 2012

(65) Prior Publication Data

US 2013/0007281 A1   Jan. 3, 2013

Related U.S. Application Data

(63) Continuation of application No. 13/173,440, filed on Jun. 30, 2011.

(51) Int. Cl.
   *G06F 15/173*   (2006.01)
   *G06F 9/50*   (2006.01)
   *H04L 29/08*   (2006.01)

(52) U.S. Cl.
   CPC ........... *G06F 9/5066* (2013.01); *G06F 9/505* (2013.01); *H04L 67/1008* (2013.01)

(58) Field of Classification Search
   CPC ..... G06F 9/5066; G06F 9/505; H04L 67/1008
   USPC ....................................................... 709/226
   See application file for complete search history.

(56) References Cited

U.S. PATENT DOCUMENTS

| | | | |
|---|---|---|---|
| 7,702,779 B1* | 4/2010 | Gupta et al. | 709/224 |
| 7,885,906 B2* | 2/2011 | Smith et al. | 706/19 |
| 8,392,928 B1* | 3/2013 | Forys et al. | 718/104 |
| 2007/0300239 A1* | 12/2007 | Adam et al. | 719/320 |
| 2008/0046895 A1* | 2/2008 | Dillenberger et al. | 718/105 |
| 2008/0189418 A1* | 8/2008 | Kimbrel et al. | 709/226 |
| 2009/0064156 A1 | 3/2009 | He et al. | |
| 2009/0157855 A1* | 6/2009 | Adam et al. | 709/221 |
| 2009/0254660 A1* | 10/2009 | Hanson et al. | 709/226 |
| 2010/0077449 A1* | 3/2010 | Kwok et al. | 726/3 |
| 2010/0180275 A1* | 7/2010 | Neogi et al. | 718/1 |
| 2010/0223379 A1* | 9/2010 | Tantawi et al. | 709/224 |
| 2010/0251253 A1* | 9/2010 | Pike | 718/104 |
| 2010/0306776 A1* | 12/2010 | Greene | G06Q 10/10 718/101 |
| 2011/0107126 A1* | 5/2011 | Goodrum | 713/320 |
| 2011/0173327 A1* | 7/2011 | Chen et al. | 709/226 |
| 2011/0282982 A1* | 11/2011 | Jain | 709/223 |

* cited by examiner

*Primary Examiner* — Viet Vu
*Assistant Examiner* — Herman Belcher
(74) *Attorney, Agent, or Firm* — Brian J. Colandreo, Esq.; Jeffrey T. Placker, Esq.; Holland & Knight LLP

(57) ABSTRACT

An input is received relative to a user objective. An application placement consideration is established based upon, at least in part, the user objective. A best-fit application placement is dynamically determined for a plurality of applications relative to a plurality of servers based upon, at least in part, the application placement consideration.

5 Claims, 3 Drawing Sheets

DYNAMICALLY TUNING SERVER PLACEMENT

RELATED APPLICATIONS

The subject application is a continuation application of U.S. patent application Ser. No. 13/173,440, filed Jun. 30, 2011, the entire content of which is herein incorporated by reference.

TECHNICAL FIELD

The present disclosure generally relates to server computing environments, and more particularly relates to placing applications on servers.

BACKGROUND

Server installations may be utilized to provide data centers, cloud computing resources, and the like. Such server installation may include a multitude of servers that may each often host many separate applications. The manner in which the applications are distributed across the various servers is often directed at maximizing the utilization of the various servers and minimizing the costs associated with the operation of the server installation. The objectives of maximizing server utilization and minimizing operating costs can be based on many variables that may often be directed by various policies that may be established by the operator of the server installation.

SUMMARY OF THE DISCLOSURE

In a first embodiment a method includes receiving, by a computing device, an input relative to a user objective. An application placement consideration may be established based upon, at least in part, the user objective. A best-fit application placement may be dynamically determined for a plurality of applications relative to a plurality of servers based upon, at least in part, the application placement consideration.

One or more of the following features may be included. Establishing the application placement consideration may include establishing an application placement consideration priority based upon, at least in part, the user objective. Dynamically determining the best-fit application placement may include resolving application placement consideration conflicts based upon, at least in part, the application placement consideration priority.

The application placement consideration may include one or more of a server capital expense consideration, a server operational expense consideration, an application collocation consideration, and an application anti-location consideration. One or more of the server capital expense consideration and the sever operation expense consideration may include one or more of a server capital cost, a license cost, a server setup cost, a server AMC cost; an energy cost, a system administration cost, and a server life cost.

The best-fit application placement may include resources assignment optimization of the plurality of servers relative to the plurality of applications. Dynamically determining the best-fit application placement may include evaluating a plurality of application placement considerations and determining a new placement for the plurality of applications relative to the plurality of servers.

According to another implementation, a computer program product includes a computer readable medium having a plurality of instructions store on it. When executed by a processor, the instructions may cause the processor to perform operations including receiving an input relative to a user objective. An application placement consideration may be established based upon, at least in part, the user objective. A best-fit application placement may be dynamically determined for a plurality of applications relative to a plurality of servers based upon, at least in part, the application placement consideration.

One or more of the following features may be included. The instructions for establishing the application placement consideration may include instructions for establishing an application placement consideration priority based upon, at least in part, the user objective. The instructions for dynamically determining the best-fit application placement may include instructions for resolving application placement consideration conflicts based upon, at least in part, the application placement consideration priority.

The application placement consideration may include one or more of a server capital expense consideration, a server operational expense consideration, an application collocation consideration, and an application anti-location consideration. One or more of the server capital expense consideration and the sever operation expense consideration may include one or more of a server capital cost, a license cost, a server setup cost, a server AMC cost; an energy cost, a system administration cost, and a server life cost.

The best-fit application placement may include resources assignment optimization of the plurality of servers relative to the a plurality of applications. The instructions for dynamically determining the best-fit application placement may include instructions for evaluating a plurality of application placement considerations and determining a new placement for the plurality of applications relative to the plurality of servers.

According to yet another implementation, a system includes a processor and a memory architecture coupled with the processor. A first software module may be executable by the processor and the memory architecture. The first software module may be configured to receive an input relative to a user objective. A second software module may be executable by the processor and the memory architecture. The second software module may be configured to establish an application placement consideration based upon, at least in part, the user objective. A third software module may be executable by the processor and the memory architecture. The third software module configured to dynamically determine a best-fit application placement for a plurality of applications relative to a plurality of servers based upon, at least in part, the application placement consideration.

One or more of the following features may be included. The second software module, configured to establish the application placement consideration, may be further configured to establish an application placement consideration priority based upon, at least in part, the user objective. The third software module, configured to dynamically determine the best-fit application placement, may be further configured to resolve application placement consideration conflicts based upon, at least in part, the application placement consideration priority.

The application placement consideration may include one or more of a server capital expense consideration, a server operational expense consideration, an application collocation consideration, and an application anti-location consideration. One or more of the server capital expense consideration and the sever operation expense consideration include one or more of a server capital cost, a license cost, a server setup cost, a server AMC cost; an energy cost, a system administration cost, and a server life cost.

The best-fit application placement may include resources assignment optimization of the plurality of servers relative to the a plurality of applications. The third software module, configured to dynamically determine the best-fit application placement, is further configured to evaluate a plurality of application placement considerations and determining a new placement for the plurality of applications relative to the plurality of servers.

The details of one or more implementations are set forth in the accompanying drawings and the description below. Other features will become apparent from the description, the drawings, and the claims.

DETAILED DESCRIPTION OF ILLUSTRATIVE EMBODIMENTS

Figure 1:
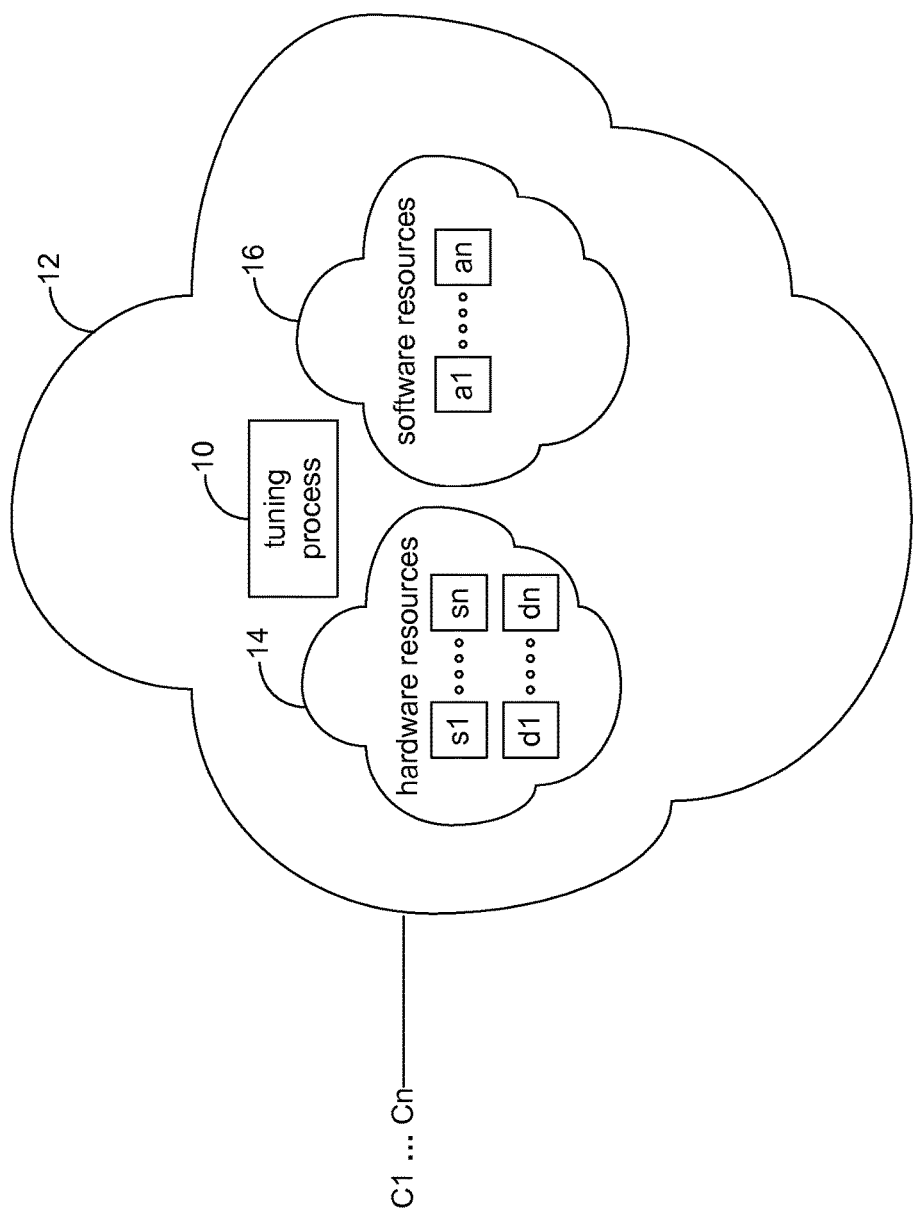
FIG. 1 diagrammatically depicts a tuning process coupled to a cloud computing environment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown tuning process 10 that may determine, at least in part, application placement within server computing environment 12. Server computing environment may include, but is not limited to, for example, a public or private cloud computing environment, a data center, or other environment including a plurality of server computers executing a plurality of applications. As shown, server computing environment 12 may include hardware resources 14 and software resources 16. Hardware resources 14 may include, but are not limited to, one or more server computers (e.g., servers s1 through sn) and one or more storage devices (e.g., storage devices d1 through dn). Software resources 16 may include one or more server based applications (e.g., applications a1 through an). Applications a1-an may include, at least in part, virtual machines that may execute various additional applications. Further, one or more of applications a1 through an may (but is not required to) include a multi-tier application. As is understood, a multi-tier application may include a plurality of interacting modules and/or components, or may include a plurality of discrete, interacting applications. For example, a multi-tier application may include a user interface component (e.g., which may generate and output displays that may be viewed by clients C1 through Cn), an application component (e.g., which may control the application's functionality), and a data component (e.g., which may store and retrieve information that may be utilized by the application component). Other examples of multi-tier applications may include components having differing functionality, and as such, the foregoing example should not be construed as a limitation of the present disclosure.

An example of servers s1 through sn (e.g., which may include one or more processors and one or more memory architectures; not shown) may include, but is not limited to, a blade server (such as an IBM BladeCenter PS704 Express) or other server computer. Examples of storage devices d1 through dn may include, but are not limited to, a hard disk drive, a solid state drive, an optical drive, random access memory, read only memory, and the like. Servers s1 through sn may each execute an appropriate operating system, such as Red Hat® Linux® for example, which may be stored on one or more of storage devices d1 through dn. (Red Hat is a registered trademark of Red Hat Corporation in the United States, other countries or both; and Linux is a registered trademark of Linus Torvalds in the United States, other countries or both.)

While not shown, server computing environment 12 may include additional hardware and software that may allow hardware resources 14 and software resources 16 to be accesses by one or more clients (e.g., clients C1 through Cn). Such additional hardware and software may include, but is not limited to, e.g., switches, bridges, web servers, and the like, which may allow clients C1 through Cn to access hardware resources 14 and/or software resources 16. Additionally, clients C1 through Cn may access server computing environment through one or more networks, including, but not limited to, the Internet, a local area network, a wide area network, or other computing network. Clients C1 through Cn may access server computing environment 12 using any suitable computing devices, including, but not limited to, desktop computers, notebook computers, mobile computing devices (e.g., data enabled cellular telephones, netbooks, personal digital assistants, etc.), executing various software, such as web browsers or application specific software.

Figure 2:
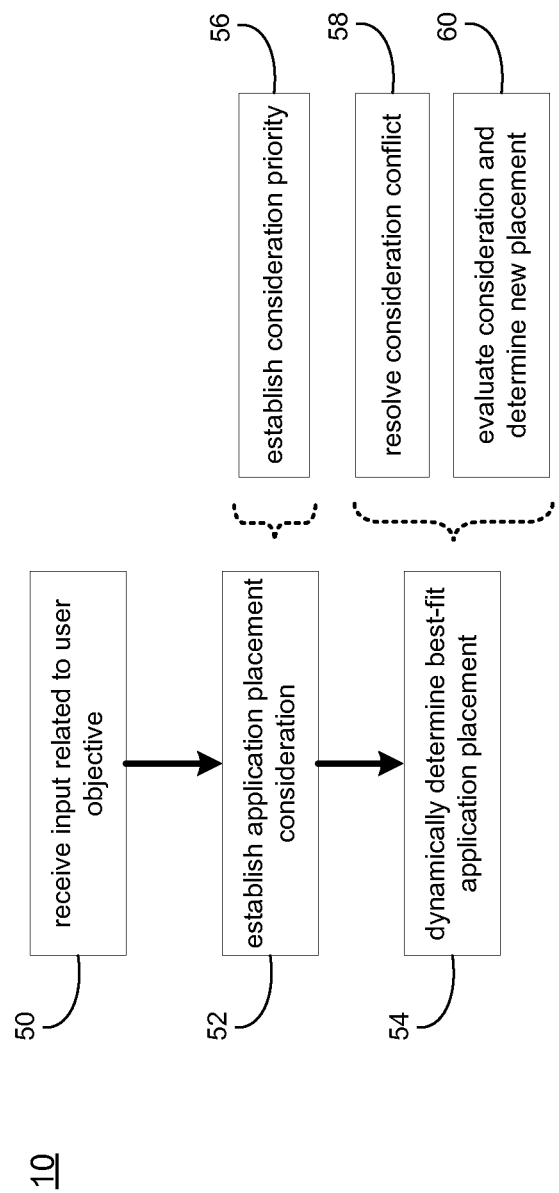
FIG. 2 is a flowchart of a process executed by the tuning process of FIG. 1.

Referring also to FIG. 2, tuning process 10 may receive 50 an input relative to a user objective. Further, tuning process 10 may establish 52 an application placement consideration based upon, at least in part, the user objective. Tuning process 10 may also dynamically determine 54 a best-fit application placement for a plurality of applications relative to a plurality of servers based upon, at least in part, the application placement consideration.

In general, tuning process 10 may dynamically determine 54 a best-fit application placement for a plurality of applications (e.g., applications a1-an) on a plurality of servers (e.g., servers s1-sn, which may be physical hosts for the applications). The best-fit application placement for the plurality of applications relative to the plurality of servers may include, as one objective, a reduction in the capital and operating costs of server computing environment 12, while maintaining an acceptable level of performance of the applications (e.g., applications a1-an) executed on the plurality of servers (e.g., servers sn-s1). As will be appreciated, a server (e.g., servers s1-sn, which may include a physical host for applications a1-an) may be capable of hosting (e.g., running) a plurality of applications (e.g., applications a1-an, which may include one or more virtual machines that may, in turn, each execute one or more other applications). However, the manner in which applications a1-an are placed on servers s1-sn (e.g., which applications are executed by which physical hosts, which applications are executed by a common physical host, and which applications are executed by a different physical host from another application) may influence the capital expenses and operating expenses of server computing environment 12. A best-fit application placement for a given group of applications (e.g., applications a1-an) relative to a given group of physical hosts (e.g., servers s1-sn) may include a variety of trade-offs and/or compromises between capital expenses associated with server computing environment 12, operating expenses associated with server computing environment 12, and performance of applications executing within server computing environment.

Consistent with an aspect of the present disclosure, receiving 50 an input relative to a user objective may influence the afore-mentioned trade-offs and/or compromises that may occur in achieving a best-fit application placement. As used herein, the user may include the end user or customer entity (e.g., an individual, a corporate entity, or the like) having applications hosted by server computing environment 12. It will be appreciated that server computing environment 12 may include a plurality of discrete users having a plurality of discrete applications hosted by server computing environment 12. In some instances, the one or more users may be a discrete entity from the operator of server computing environment 12. For example, the operator of server computing environment 12 may include the owner of the physical resources (e.g., servers s1-sn), the administrator of the server computing environment.

Based upon, at least in part, the input received 50 relative to the user objective, tuning process 10 may establish 52 an application placement consideration, e.g., which may, in part, influence the best-fit application placement. The input relative to the user objective may be received, e.g., via any suitable interface such as a REST API (representational state transfer application programming interface), webservice, or the like. The objective of the user may include, for example, a business objective or business goal of the user (e.g., with respect to the use and/or management of the applications hosted by server computing environment 12). For example, user objectives with respect to applications hosted by server computing environment 12 may include, but is not limited to, optimized performance of the applications, optimized availability of the applications, reduced capital expense, reduces operating expense, etc.

Tuning process 10 may establish 52 an application placement consideration based upon, at least in part, the received 50 input relative to the user objective. Establishing 52 an application placement consideration may include mapping the objective of the user to a consideration that may be used as an input, or may otherwise influence, the best-fit application placement. For example, an application placement consideration may be established 52 to optimize one or more of a server capital expense consideration, a server operational expense consideration, an application collocation consideration, and an application anti-location consideration. Further the received 50 input may include user objectives related to one or more of a server capital cost, a license cost, a server setup cost, a server annual maintenance contract cost (AMC cost) for maintenance of the system and/or software; an energy cost, a system administration cost, and a server life cost. The received 50 input may also include a designation of each of the foregoing items being included as a capital expense or an operating expense.

Establishing 52 the application placement consideration may include establishing 56 an application placement consideration priority based upon, at least in part, the user objective. Further, dynamically determining 54 the best-fit application placement may include resolving 58 application placement consideration conflicts based upon, at least in part, the application placement consideration priority. For example, tuning process 10 may receive an input relative to a user objective that may indicate that a user objective of optimizing (e.g., reducing) capital expense. As such, tuning process 10 may establish an application placement consideration priority in favor of collocation of applications (e.g., hosting applications a1 and a2 on common physical server s1). Such collocation of applications a1 and a2 may optimize physical resources. However, applications a1 and a2 may, for example, be bandwidth intensive applications that may exhibit greater performance when anti-located (e.g., each of applications a1 and a1 are hosted on separate physical servers). As such, a conflict between collocation (and therein optimized capital expense) and optimized performance may be resolved 58 in favor of collocation based upon, at least in part, the established 52 application placement consideration priority for collocation. Accordingly, a best-fit application placement may include collocating applications a1 and a2 on the same server (e.g., s1). Similarly, based upon, at least in part, a received 50 input relative to a user objective for optimized performance of a particular application (e.g., application a3), tuning process 10 may establish 56 a location priority with respect to a particular server (e.g., server s2), which may, for example, include particular hardware resources that may provided improved performance of application a3 when hosted by server s2, as compared to being hosted by another server (e.g., which may not include the particular hardware resources). In such a situation, a conflict between the preference for performance (e.g., which may indicate a desirability of application a3 being hosted by server s2) and capital expense (e.g., which may result from hosting application a3 on server s2, as opposed to hosting application a3 on another server) may be resolved 58 based upon, at least in part, the established 56 application placement consideration priority (e.g., which may include the location priority).

Consistent with the foregoing, tuning process may establish 52 application placement considerations, and may establish 56 placement consideration priorities, according to received 50 inputs related to user objectives. Further, tuning process may dynamically determine 54 a best-fit application placement for a plurality of applications relative to a plurality of servers, based upon, at least in part, the application placement considerations. In this manner, dynamically determining 54 best-fit application placement may include an at least partially stochastic process, in which the application considerations and application consideration priorities are not fixed, but may depend upon inputs received relating to user objectives. As such, the user objectives may influence the placement of the plurality of applications relative to the plurality of servers.

As discussed above, tuning process 10 may establish 52 one or more application placement considerations based upon, at least in part, received 50 inputs related to user objectives. However, it will be appreciated that user objectives may not influence all possible application placement considerations. As such, default application placement considerations may be included. Such default application placement considerations may relate to, but are not limited to, optimizing capital expense, optimizing operational expense, rules relating to collocation and anti-location of applications, performance optimization, and the like. Such default application placement considerations may include default priorities (e.g., for the purpose of resolving conflicts with other application placement considerations). In the absence of being modified by received 50 inputs related to user objectives, default priorities of default application placement considerations may be based upon, at least in part, policies established by the server computer environment operator, historical performance and cost data collected by monitoring various attributes of server computer environment 12 over a course of time, etc. However, the default application placement considerations and default priorities thereof, may be modified based upon, at least in part, received 50 inputs related to user objectives (e.g., via establishing 52 application placement considerations by tuning process 10).

Figure 3:
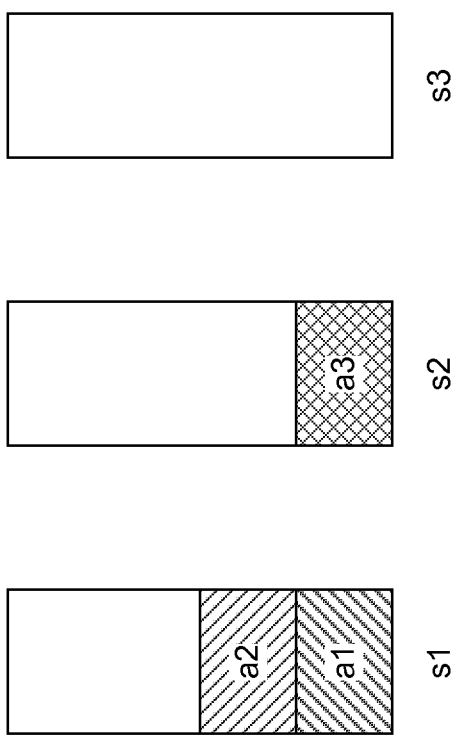
FIG. 3 diagrammatically depicts an application to server map that may be generated by the tuning process of FIG. 1.

As generally described above, the best-fit application placement may include resources assignment optimization of the plurality of servers relative to the plurality of applications. That is the best-fit application placement may create an application hosting map that may indicate which applications should be hosted by which servers in order to optimize capital expense, operating expense, performance, and the like, taking into consideration the application placement considerations (and application placement consideration priorities) established 52 based upon the received 50 inputs related to the user objectives. Referring to FIG. 3, and continuing with the foregoing example, an application map is diagrammatically depicted in which applications a1 and a1 may desirably be collocated on the same server (e.g., server s1) and application a3 may be located on a specific server (e.g., server s3) having particular hardware resources. Further, server s3 may be unpopulated, thereby saving operational expense. It should be noted that, for the purpose of clarity or illustration and description, while only three servers (namely servers s1, s2, s3) and three applications (namely applications a1, a2, a3) are depicted, server computing environment may include any number of servers and applications depending upon user need and design criteria, and should not be construed as a limitation of the present disclosure.

Dynamically determining 54 the best-fit application placement may include evaluating 60 a plurality of application placement considerations (e.g., which may include both default application placement considerations as well as application placement considerations established 52 based upon, at least in part, received 50 inputs related to user objectives) and determine a new placement for the plurality of applications relative to the plurality of servers. For example, as tuning process 10 may dynamically determine 54 a best-fit application placement, at any point in time (either in real time or at time intervals) that an application placement consideration may be established 52 (e.g., based upon a received 50 input), or an application consideration priority may be established 56 or changed, tuning process 10 may evaluate 60 the application placement considerations and determine a new placement of the plurality of applications relative to the plurality of servers, which may be different than a prior placement. In this regard, when dynamically determining 54 best-fit application placement, tuning process 10 may consider (e.g., evaluate 60) all application placement considerations, and any application consideration priorities, from all users of server computing environment 12. Further, tuning process 10 may ascertain all such application considerations and application consideration priorities prior to dynamically determining 54 the best-fit application placement, thereby allowing the dynamically determined 54 best-fit application placement to be based upon, at least in part, such application placement considerations and application placement consideration priorities.

For example, in an embodiment user may provide input and/or priority indication with respect to various application placement considerations, including, but not limited to, Capital Expense (CapEx) of the server, (2) Operational Expense (OpEx) of the server, (3) collocation of virtual machines (or other applications), and anti-location of virtual machines (or other applications). The expense related application placement considerations (e.g., CapEx and OpEx) may be further classified by the user, and the user may provide input indicating what expense type (e.g., CapEx or OpEx) each further classification should be categorized as. Examples of further classifications of expense related application placement considerations may include, but are not limited to, capital cost of servers, additional license cost of servers based upon, at least in part, processors, setup cost of servers, AMC cost of server per 12 months, energy cost of servers per month, system administration cost per server per month, and useful life of servers (e.g., in terms of the number of months or years).

In consideration of the foregoing application placement considerations, the total cost of a server deployment (e.g., server farm, data center, etc.) may be calculated as the sum of CapEx and OpEx cost of each of the servers used for the server deployment. According to the instant illustrative embodiment, the server cost $C_i$ of a given server may be defined as the sum of CapEx and OpEx of a given server for a period of time. For example, to calculate server cost of a given server for a period of 12 months may be given by:

> The total server cost for 12 months=Capital cost of server+additional processor license cost per 12 months+One time setup cost+AMC for 12 months+energy per month*12 months+sys admin cost per month*12 months Continuing with the foregoing illustrative example, the objective function of the solution may be to minimize the total cost of the server farm deployment using stochastic optimization technique while considering the priority of the application placement considerations. Accordingly, the objective function may be to minimize the total cost to deploy all of the application subject to various constraints, examples of which are provided below for illustrative purposes.

Objective Function $$\text{Minimize} \sum_{i=1}^{N} C_i x_i \ \forall \ i$$

Subscripts

| | |
|---|---|
| i | Denotes a physical server |
| j | Denotes an application/VM |

Inputs
N=Number of physical servers, i=1 . . . N
K=Number of applications/VMs, j=1 . . . K
$P_i$=Processor Capacity of Server i
$M_i$=Memory Capacity of Server i
$C_i$=Cost of Server i
$p_j(\xi)$=Processor requirement (random) variations for application j where $p_j$, $vp_j$ are average and standard deviations of processor usage by application
$m_j(\xi)$=Memory requirement (random) variations for application j where $m_j$, $vm_j$ are average and standard deviations of memory usage by application
$SL_j$=Service level target of application j
η=confidence level desired by applications with respect to service level targets.

VM Self Management Resource Consumption

It may be noted that, in some instances, virtualization features may require resources, and such resources may not be available for application usage.
$sp_{ij}$=Processors consumed by application j on server i.
$sm_{ij}$=Memory consumed by application j on server i Deterministic Variables
$x_i$=Binary (0 or 1) variable representing the state of server i. (0=server active 1=server shutdown).
$y_{ij}$=Binary (0 or 1) variable representing the state of partition j on server i. (0=partition active 1=partition doesn't exist)
$fp_i$=Amount of processor capacity reserved in common pool of server i.
$fm_i$=Amount of memory reserved in common pool of server i Random Variables
$ep_i(\xi)$=Amount of excess quantity above processor capacity requested by applications deployed on server i.
$em_i(\xi)$=Amount of excess quantity above memory capacity requested by applications deployed on server i.
$up_i(\xi)$=Amount of unutilized processor capacity in server
$um_i(\xi)$=Amount of unutilized memory capacity in server i.
$sl_j(\xi)$=Service level of application j Constraints to be Solved
1) Processor capacity constraints of server i.

$$\sum_{j=1}^{K} (p_j(\xi) + sp_{ij}) * y_{ij} + up_i(\xi) - ep_i(\xi) = P_i \ \forall \ i$$

2) The amount of processor capacity on a server to be reserved in the common pool may be at least a factor of standard deviation of the processor workloads of all the applications deployed on the server.

$$fm_i \geq k * vm_{ij} * y_{ij} \forall i, \forall j$$

This constraint may aid in addressing the SLA (service level agreement) during various application workloads on the server.

3) In some embodiments it may be desirable to ensure that each deployed application on a server may get a minimum amount of processor resources, which may be equal to the average processor requirement of the application.

$$\sum_{j=1}^{K} (p_j + sp_{ij}) * y_{ij} + fp_i = P_i \ \forall \ i$$

4) Memory capacity constraints of server i.

$$\sum_{j=1}^{K} (m_j(\xi) + sm_{ij}) * y_{ij} + um_i(\xi) - em_i(\xi) = M_i \ \forall \ i$$

5) The amount of memory capacity on a server to be reserved in the common pool may be at least a factor of standard deviation of the memory workloads of the all applications deployed on the server.

$fm_i \geq k * vm_{ij} * y_{ij} \forall i, \forall j$

This constraint may also aid in addressing the SLA during various application workloads on the server.

6) In some embodiments it may be desirable that each deployed application on a server may get a minimum amount of memory resources equal to the average memory consumption of the application.

$$\sum_{j=1}^{K} (m_j + sm_{ij}) * y_{ij} + fm_i = M_i \ \forall \ i$$

7) Application j of server i can be activated only if server i is running $y_{ij} - x_i \leq 0 \forall i, j$ 8) An application can be deployed on only one server.

$$\sum_{i=1}^{N} y_{ij} = 1 \ \forall \ j$$

9) Applications co-location $y_{ij1} + y_{ij2} = 0 \forall i, j$

10) Applications anti-location $y_{ij1} + y_{ij2} <= 1 \forall i, j$

11) Application service level constraints. Service level achieved by an application may desirably be greater than the service level targets with desired confidence level.

$Pr\{sl_j(\xi) \geq SL_j\} \geq \eta$

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   receiving, by a computing device, an input relative to a user objective, wherein the input relative to the user objective is dynamically received via an application programming interface, wherein the user objective includes at least one of an optimized performance of an application and an optimized availability of the application;
   establishing, by the computing device, an application placement consideration based upon, at least in part, the user objective;
   dynamically determining, by the computing device, a best-fit application placement for a plurality of applications relative to a plurality of servers based upon, at least in part, the application placement consideration that includes a server capital expense consideration, a server operational expense consideration, an application collocation consideration, a stochastic process, and an application anti-location consideration, wherein an amount of processor capacity on each of the plurality of servers is based upon, at least in part, at least a factor of standard deviation of processor workloads of the plurality of applications deployed on each of the plurality of servers;
   establishing an application placement consideration priority;
   resolving application placement consideration conflicts between the application collocation consideration and the application anti-location consideration based upon, at least in part, the application placement consideration priority;

determining a change in the application placement consideration priority based upon, at least in part, the input relative to the user objective; and determining, dynamically, a new placement for the plurality of applications relative to the plurality of servers based upon, at least in part, the change in the application placement consideration priority.

2. The method according to claim 1, wherein establishing the application placement consideration includes establishing the application placement consideration priority based upon, at least in part, the user objective.

3. The method according to claim 1, wherein one or more of the server capital expense consideration and the sever operation expense consideration include one or more of a server capital cost, a license cost, a server setup cost, a server AMC cost; an energy cost, a system administration cost, and a server life cost.

4. The method according to claim 1, wherein the best-fit application placement includes resources assignment optimization of the plurality of servers relative to the a plurality of applications.

5. The method according to claim 1, wherein dynamically determining the best-fit application placement includes evaluating a plurality of application placement considerations.

* * * * *